(12) United States Patent
Matsuno et al.

(10) Patent No.: US 9,831,492 B2
(45) Date of Patent: Nov. 28, 2017

(54) NONAQUEOUS ELECTROLYTE SECONDARY BATTERY AND BATTERY PACK

(71) Applicant: KABUSHIKI KAISHA TOSHIBA, Minato-ku, Tokyo (JP)

(72) Inventors: Shinsuke Matsuno, Tokyo (JP); Norikazu Osada, Tokyo (JP); Keiko Okamoto, Kanagawa (JP); Tomokazu Morita, Chiba (JP); Takashi Kuboki, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 553 days.

(21) Appl. No.: 14/482,166

(22) Filed: Sep. 10, 2014

(65) Prior Publication Data

US 2015/0086853 A1    Mar. 26, 2015

(30) Foreign Application Priority Data

Sep. 25, 2013    (JP) .................................. 2013-197760

(51) Int. Cl.
*H01M 4/485* (2010.01)
*H01M 4/131* (2010.01)
(Continued)

(52) U.S. Cl.
CPC .......... *H01M 4/364* (2013.01); *H01M 4/131* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS 5,576,121 A * 11/1996 Yamada .................. H01M 4/13
                                                             423/44
5,599,643 A    2/1997 Plichta et al.
(Continued)

FOREIGN PATENT DOCUMENTS

CN    101147281 A    3/2008
JP    01-163969 A  *  6/1989
(Continued)

OTHER PUBLICATIONS

Chinese First Office Action dated Apr. 19, 2016 from corresponding Chinese Patent Application No. 2014104428831, 8 pages.

*Primary Examiner* — Tracy Dove
(74) *Attorney, Agent, or Firm* — Ohlandt, Greeley, Ruggiero & Perle, L.L.P.

(57) ABSTRACT

A nonaqueous electrolyte secondary battery of an embodiment includes an exterior member, a cathode including a cathode active material layer housed in the exterior member, an anode including an anode active material layer housed in the exterior member and spatially separated from the cathode by a separator, and a nonaqueous electrolyte filled in the exterior member. The cathode active material layer contains lithium-copper oxide and copper oxide. A peak intensity ratio d(002)/d(010) between a plane index d(010) derived from the lithium-copper oxide and a plane index d(002) derived from the copper oxide is not lower than 0.1 and not higher than 0.5 at an X-ray diffraction peak.

14 Claims, 4 Drawing Sheets

(51) Int. Cl.
*H01M 4/36* (2006.01)
*H01M 4/134* (2010.01)
*H01M 4/38* (2006.01)
*H01M 10/0525* (2010.01)
*H01M 4/02* (2006.01)

(52) U.S. Cl.
CPC ........... *H01M 4/387* (2013.01); *H01M 4/485* (2013.01); *H01M 10/0525* (2013.01); *H01M 2004/021* (2013.01); *Y02T 10/7011* (2013.01)

(56) References Cited

U.S. PATENT DOCUMENTS

| | | | |
|---|---|---|---|
| 5,744,265 A * | 4/1998 | Barker | H01M 4/131 429/220 |
| 6,605,386 B1 | 8/2003 | Kasamatsu et al. | |
| 2006/0251967 A1 | 11/2006 | Goh | |
| 2009/0117463 A1 | 5/2009 | Takezawa et al. | |
| 2009/0284679 A1 | 11/2009 | Kim et al. | |
| 2011/0250509 A1 | 10/2011 | Yamaguchi et al. | |

FOREIGN PATENT DOCUMENTS

| | | |
|---|---|---|
| JP | 2000-012082 A | 1/2000 |
| JP | 2000-173585 A | 6/2000 |
| JP | 2001-160395 A | 6/2001 |
| JP | 2003-076912 A | 3/2003 |
| JP | 2003-197191 A | 7/2003 |
| JP | 2004-284845 A | 10/2004 |
| JP | 2008-165237 A | 7/2008 |
| JP | 2008-532224 A | 8/2008 |
| JP | 2008-245969 A | 10/2008 |
| JP | 2009-135084 A | 6/2009 |
| JP | 2010-080196 A | 4/2010 |
| JP | 2011-228291 A | 11/2011 |
| WO | 2010/001892 A1 | 1/2010 |

* cited by examiner

Fig.4 ated on Sep. 25, 2013; the entire contents of which are incorporated herein by reference.

NONAQUEOUS ELECTROLYTE SECONDARY BATTERY AND BATTERY PACK

CROSS-REFERENCE TO RELATED APPLICATION

This application is based upon and claims the benefit of priority from Japanese Patent Application No. 2013-197760, filed on Sep. 25, 2013; the entire contents of which are incorporated herein by reference.

FIELD

Embodiments described herein relate to nonaqueous electrolyte secondary batteries and battery packs.

BACKGROUND

Nonaqueous electrolyte secondary batteries (mostly lithium-ion secondary batteries) that use a carbonaceous material as the anode active material and a layered oxide containing nickel, cobalt, manganese, or the like as the cathode active material have already been put into practical use as the power supplies for a wide variety of fields ranging from small-sized electronic devices to large-sized electric vehicles and the like. The user demands for even smaller size, lighter weight, and longer operating time and life are strong, and there is an increasing demand for higher battery densities and capacities and higher repetitive performance. However, a conventional carbonaceous material has a limit in increasing its charge/discharge capacity. Also, low-temperature baked carbon that is considered to have a high capacity is low in material density, and therefore, it is difficult to increase the charge/discharge capacity per unit volume. Therefore, to realize high-capacity batteries, development of a new anode material is necessary.

The use of a single metal such as aluminum (Al), silicon (Si), germanium (Ge), tin (Sn), or antimony (Sb) as the anode material for achieving a higher capacity than a carbonaceous material has been suggested. Particularly, where Si is used as the anode material, a high capacity of 4200 mAh per unit weight (1 g) is obtained. However, an anode made of such a single metal repeatedly absorbs and releases Li. Therefore, microscopic pulverization of elements occurs, and excellent charge-discharge cycling characteristics cannot be achieved.

So as to solve the above problems, a tin oxide or silicon oxide in an amorphous state may be used to achieve a high capacity and excellent cycling characteristics at the same time, and, in combination with a carbonaceous material, further improvement can be realized. However, even if an improved, high-capacity tin oxide or silicon oxide is used, the load on the battery due to volume expansion at a time of charge and contraction at a time of discharge is still very large. Specifically, the copper foil used as collectors is greatly deformed, and internal short-circuiting is likely to occur at the time of the initial charge. Also, holes might be formed in the foil due to repetitive use, and seriously lower the level of security.

DETAILED DESCRIPTION

A nonaqueous electrolyte secondary battery of an embodiment includes an exterior member, a cathode including a cathode active material layer housed in the exterior member, an anode including an anode active material layer housed in the exterior member and spatially separated from the cathode by a separator, and a nonaqueous electrolyte filled in the exterior member. The cathode active material layer contains lithium-copper oxide and copper oxide. A peak intensity ratio d(002)/d(010) between a plane index d(010) derived from the lithium-copper oxide and a plane index d(002) derived from the copper oxide is not lower than 0.1 and not higher than 0.5 at an X-ray diffraction peak. The battery of an embodiment may be used for a battery pack.

A nonaqueous electrolyte secondary battery of an embodiment includes an exterior member, a cathode including a cathode active material layer housed in the exterior member, an anode including an anode active material layer housed in the exterior member and spatially separated from the cathode by a separator, and a nonaqueous electrolyte filled in the exterior member. At least one material selected from copper, copper oxide, and copper composite oxide exists in 5 to 95% of a surface area of the anode active material layer on the anode active material layer. The battery of an embodiment may be used for a battery pack.

First Embodiment

A nonaqueous electrolyte secondary battery according to a first embodiment is now described.

The nonaqueous electrolyte secondary battery according to the first embodiment includes: an exterior member; a cathode that includes a cathode active material housed in the exterior member; an anode that includes an anode active material housed in the exterior member, the anode active material being spatially separated from the cathode via a separator, for example; and a nonaqueous electrolyte filled in the exterior member.

Figure 1:
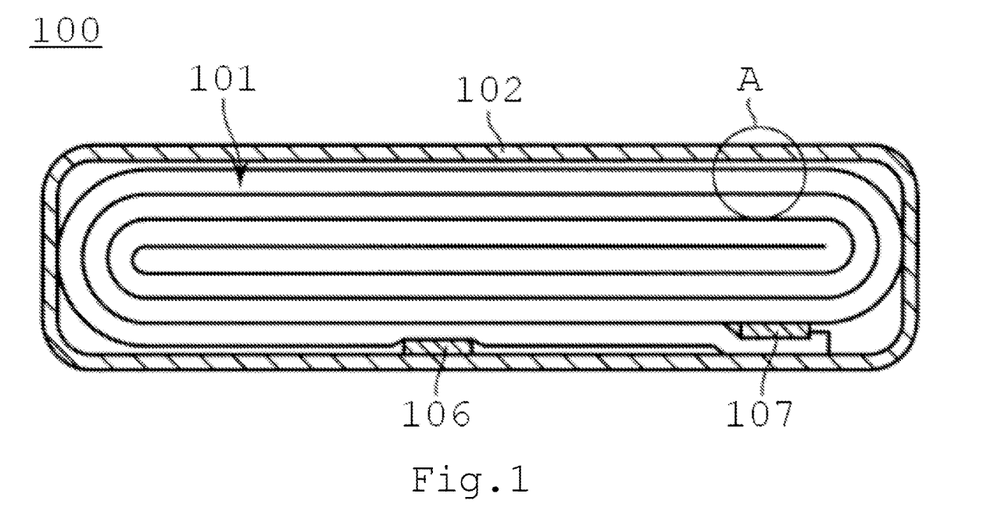
FIG. 1 is a conceptual diagram of a nonaqueous electrolyte secondary battery of an embodiment.
Figure 2:
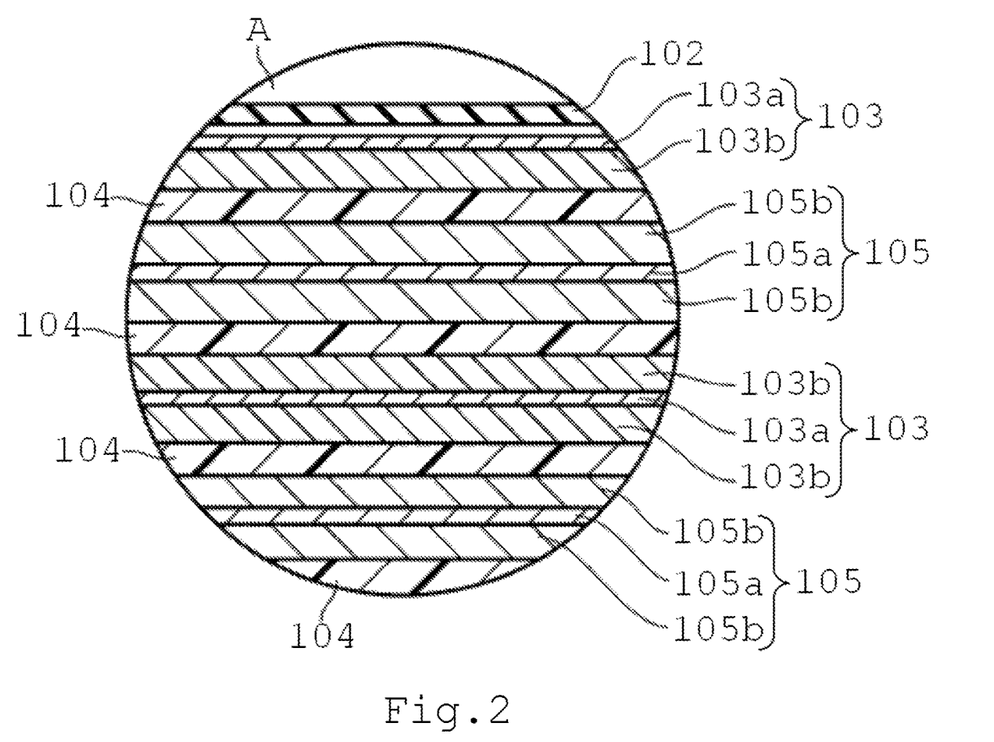
FIG. 2 is an enlarged conceptual diagram of the portion A shown in FIG. 1.

Referring now to FIGS. 1 and 2, an example of the nonaqueous electrolyte secondary battery 100 according to this embodiment is described in greater detail. FIG. 1 is a schematic cross-sectional view of the nonaqueous electrolyte secondary battery 100 having an exterior member 102 made from a laminated film. FIG. 2 is an enlarged cross-sectional view of the portion A shown in FIG. 1. The respective drawings are schematic views designed for explanation, and the shapes, sizes, and ratios shown in the drawings might differ from those of actual devices, but can be arbitrarily changed by taking into account the following description and known arts.

A flat wound electrode group 101 is housed in an exterior member 102 formed from a laminated film having aluminum foil interposed between two resin layers. The flat wound electrode group 101 is formed by spirally winding a stack structure formed by stacking an anode 103, a separator 104, a cathode 105, and a separator 104 in this order from the outer side, and is then press-molded. The outermost portion of the anode 103 has a structure in which an anode active material layer 103b is formed on the inner-side surface of the anode collector 103a as shown in FIG. 2. Each of the other portions of the anode 103 has an anode active material layer 103b formed on either surface of the anode collector 103a. The active material in the anode active material layer 103b contains a active material according to the first embodiment. The cathode 105 has cathode active material layers 105b formed on both surfaces of a cathode collector 105a.

In the vicinity of the edge of the outer circumference of the wound electrode group 101, an anode terminal 106 is electrically connected to the anode collector 103a of the outermost portion of the anode 103, and a cathode terminal 107 is electrically connected to the cathode collector 105a of the cathode 105 on the inner side of the outermost portion of the anode 103. The anode terminal 106 and the cathode terminal 107 extend to the outside through an opening of the sac-like exterior member 102. A liquid nonaqueous electrolyte is introduced through the opening of the sac-like exterior member 102. The opening of the exterior member 102 is heat-sealed, with the anode terminal 106 and the cathode terminal 107 being interposed. In this manner, the wound electrode group 101 and the nonaqueous electrolyte are fully-sealed.

Although the wound electrode group 101 is described as the electrode group in this embodiment, a stack electrode group formed by alternately stacking cathodes and anodes with separators being interposed therebetween may be used. However, the effects of this embodiment can be more effectively achieved with a wound electrode group.

The anode terminal 106 may be Al or an aluminum alloy containing an element such as Mg, Ti, Zn, Mn, Fe, Cu, or Si, for example. So as to lower contact resistance to the anode collector 103a, the anode terminal 106 is preferably the same material as the anode collector 103a.

The cathode terminal 107 may be made of a material that has electrical stability and conductivity at potential of 3 to 4.25 V with respect to lithium ion metal. Specifically, Al or an aluminum alloy containing an element such as Mg, Ti, Zn, Mn, Fe, Cu, or Si can be used. So as to lower contact resistance to the cathode collector 105a, the cathode terminal 107 is preferably the same material as the cathode collector 105a.

The exterior member 102, the cathode 105, the anode 103, the electrolyte, and the separator 104, which are components of the nonaqueous electrolyte secondary battery 100, will be described below in detail.

1) Exterior Member

The exterior member 102 is formed from a laminated film having a thickness of 0.5 mm or smaller. Alternatively, a metal container having a thickness of 1.0 mm or smaller is used as the exterior member 102. More preferably, the metal container has a thickness of 0.5 mm or smaller.

The exterior member 102 may be flattened (thinned) in shape, or may have a rectangular shape, a cylindrical shape, a coin-like shape, or a button-like shape. Examples of the exterior member 102 include a small-battery exterior member mounted on a portable electronic device or the like, and a large-battery exterior member mounted on two- or four-wheeled vehicle or the like, depending on battery size.

The laminated film is a multilayer film having a metal layer interposed between resin layers. So as to reduce weight, the metal layer is preferably aluminum foil or aluminum alloy foil. The resin layers may be made of a polymeric material such as polypropylene (PP), polyethylene (PE), nylon, or polyethylene terephthalate (PET). The laminated film can be formed into the shape of an exterior member by thermal adhesion sealing.

The metal container is made of aluminum, an aluminum alloy, or the like. The aluminum alloy is preferably an alloy containing an element such as magnesium, zinc, or silicon. If the alloy contains a transition metal such as iron, copper, nickel, or chromium, the amount thereof is preferably 100 mass ppm or smaller.

2) Cathode 105

The cathode 105 has a structure in which the cathode active material layer(s) 105b containing an active material is supported by one or both surfaces of the cathode collector 105a.

The thickness of one cathode active material layer 105b is preferably not smaller than 1 μm and not greater than 150 μm, so as to maintain large-current discharge characteristics and the cycle life of the battery. Therefore, in a case where there are cathode active material layers 105b supported by both surfaces of the cathode collector 105a, the total thickness of the cathode active material layers 105b is preferably not smaller than 20 μm and not greater than 300 μm. More preferably, the thickness of one cathode active material layer 105b is not smaller than 30 μm and not greater than 120 μm. With the thickness falling within this range, the large-current discharge characteristics and the cycle life improve.

The cathode active material layers 105b may contain a conducting agent other than a cathode active material.

The cathode active material layers 105b may also contain a binding agent that binds cathode materials.

The cathode active material layers 105b contain at least lithium-copper oxide and copper oxide. The lithium-copper oxide may be lithium-copper oxide ($Li_2CuO_2$) or lithium-copper composite oxide (such as $Li_2Cu_xNi_{1-x}O_4$, $0<x\leq1$). The cathode active material layers 105b further contain lithium composite metal oxide, which is a lithium composite oxide containing a transition metal. Examples of such materials include lithium-manganese composite oxide (such as $LiMn_2O_4$ or $LiMnO_2$), lithium-nickel composite oxide (such as $LiNiO_2$), lithium-cobalt oxide ($LiCoO_2$), a lithium iron phosphate compound ($LiFePO_4$), lithium-nickel-cobalt-manganese composite oxide having its transition metal substituted by another metal (such as $LiNi_xCo_yMn_zO_2$, $x+y+z=1$), lithium-manganese-cobalt composite oxide (such as $LiMn_{2-x}Co_xO_4$, $0\leq x\leq1$), and a lithium composite phosphate compound (such as $LiMn_xFe_{1-x}PO_4$, $0\leq x\leq1$). The copper oxide is copper (II) oxide (CuO).

The nonaqueous electrolyte secondary battery 100 having the cathode active material layers 105b containing lithium-copper oxide $Li_2CuO_2$, lithium composite metal oxide $LiNi_{1/3}Co_{1/3}Mn_{1/3}O_2$, and copper oxide CuO is described below as an example, and charge and discharge of the nonaqueous electrolyte secondary battery 100 is also described below.

The lithium composite metal oxide $LiNi_{1/3}Co_{1/3}Mn_{1/3}O_2$ can function as a cathode active material during a charge-discharge cycle, like a general cathode material. Meanwhile, the lithium-copper oxide $Li_2CuO_2$ can extract a capacity of 400 mAh/g only at the time of the initial charge. Therefore, there is little discharge capacity, but the lithium-copper oxide is suitable as a regulator for the initial charge/discharge efficiency. Although the details are unknown, the existence of a reasonable amount of copper oxide (CuO) is likely to hinder a charge reaction caused by lithium released from the lithium-copper oxide ($Li_2CuO_2$) as the first charge reaction. However, it has become clear that the effect to hinder the copper oxide (CuO) charge becomes smaller as the charge and discharge is repeated for the second and subsequent times, and the reaction of releasing lithium from the lithium-copper oxide ($Li_2CuO_2$), which has not reacted near the copper oxide (CuO), as the repetition of charge and discharge is continued. As described above, as lithium is gradually released in the second and subsequent charge-discharge cycles, lithium can be continuously supplied to the silicon oxide composite anode 103, which has poor charge/discharge efficiency during the cycle.

So as to continuously supply lithium to the anode 103, the peak intensity ratio d(002)/d(010) between the plane index d(010) derived from lithium-copper oxide and the plane index d(002) derived from copper (II) oxide (hereinafter referred to simply as the peak intensity ratio) is preferably not lower than 0.1 and not higher than 0.5. When the peak intensity ratio is not lower than 0.1 and not higher than 0.5, the reaction of releasing lithium from $Li_2CuO_2$ gradually progresses in the second and subsequent cycles. When the peak intensity ratio is lower than 0.1, the amount of the copper oxide (CuO) is smaller than the amount of the lithium-copper oxide ($Li_2CuO_2$), or the copper oxide (CuO) has lower crystallinity. Therefore, almost all the lithium-copper oxide ($Li_2CuO_2$) reacts at the time of the first charge, and lithium cannot be continuously supplied to the anode 103. When the peak intensity ratio exceeds 0.5, the lithium-copper oxide ($Li_2CuO_2$) does not sufficiently react at the time of the first charge, and cannot function as the regulator for the initial charge/discharge efficiency. The preferred range of the peak intensity ratio is from 0.2 to 0.3.

With the peak intensities of the plane index d(010) derived from lithium-copper oxide and the plane index d(002) derived from copper (II) oxide, the cathode 105 is removed from the nonaqueous electrolyte secondary battery 100, and the cathode active material layer 105b is scraped off the removed cathode 105. The scraped particles are analyzed by X-ray diffractometry (XRD) using a CuKα ray at 40 kV, 100 mA, and 0.01° per minute. From the diffraction intensity (counts) of the obtained spectrum, the peaks of the respective plane indices are identified. Without peak processing, such as a background removal or a Kα2 removal, the peaks of the plane index d(010) derived from lithium-copper oxide and the plane index d(002) derived from copper (II) oxide, or the values of the peaks, are set as peak intensities.

So as to continuously supply lithium to the anode 103, the lithium-copper oxide and the copper oxide preferably each have two or more peaks in the particle size distribution. Here, one of the peaks in the particle size distribution of the lithium-copper oxide or the copper oxide is of the lithium-copper oxide or the copper oxide. (For example, the particle size distribution is not of a mixture of lithium-copper oxide having one peak at 30 µm and copper oxide having one peak at 5 µm.) The particle size distribution is of a mixture of the lithium-copper oxide and the copper oxide, and the particles having the peak-top particle size preferably contain both the lithium-copper oxide and the copper oxide.

An example state where the lithium-copper oxide ($Li_2CuO_2$) and the copper oxide (CuO) have two peaks at 5 µm and 25 µm in the particle size distribution is now described. Where $Li_2CuO_2$ exists, the smaller particles of $Li_2CuO_2$ react promptly, but the larger particles are slow to react and are likely not to react at the time of the initial charge and discharge. Therefore, the larger particles can contribute to charge/discharge reactions in the second and subsequent cycles. That is, the smaller particles can function mainly as the regulator for the initial charge/discharge efficiency, and the larger particles can function as the lithium supplier in the second and subsequent cycles. The particle size ratio (the peak ratio) between the particle size (the peak position) of the larger particles and the particle size (the peak position) of the smaller particles needs to be adjusted in accordance with the initial charge/discharge efficiency and the charge/discharge efficiency of the anode 103 in the second and subsequent cycles. The particle size distribution of the larger particles may have step-like portions. A particularly preferable particle size distribution has at least a peak between 0.5 µm and 15 µm, and a peak between 20 µm and 100 µm. If the particles are too small or too large, it is difficult to manufacture the cathode 105. The preferred peak intensity ratio (the peak of the particle sizes of the larger particles)/(the peak of the particles sizes of the smaller particles) is not lower than 0.1 and not higher than 1.

The particle size distribution is analyzed by measuring the lithium-copper oxide and the copper oxide as the materials by laser diffractometry when the anode active material layers 103b are manufactured. In the measurement, NMP is used as the solvent. Prior to the measurement, dispersion using ultrasonic waves is performed for 10 minutes. After the measurement, the peaks are extracted as they are.

So as to continuously supply lithium to the anode 103, the relationship, $0.01 \leq (M_{Cu}/M_c) \leq 0.5$, is preferably established, where $M_c$ represents the number of moles of the lithium composite metal oxide in the cathode active material layers 105b, and $M_{Cu}$ represents the number of moles of the lithium-copper oxide. If $M_{Cu}/M_c$ in the cathode active material layers 105b is less than 0.01, the amount of the lithium-copper oxide is too small, and therefore, the lithium-copper oxide cannot function as the efficiency regulator. If $M_{Cu}/M_c$ exceeds 0.5, the initial charge/discharge efficiency of the cathode 105 is lower than the initial charge/discharge efficiency of the anode 103, which is not preferable. More preferably, $M_{Cu}/M_c$ is in the range of 0.05 to 0.30.

As for the number of moles $M_c$ of the lithium composite metal oxide and the number of moles $M_{Cu}$ of the lithium-copper oxide, the cathode active material layers 105b of the cathode 105 extracted from the nonaqueous electrolyte secondary battery 100 are observed at 3000-fold magnification by scanning electron microscope-energy dispersive X-ray spectroscopy (SEM-EDX). After that, elemental mapping is performed with five views by EDX, to examine the respective elemental compositions. In the elemental mapping, the cathode 105 is divided into five, and the elemental mapping is performed in the middle portion, to determine the mean value.

Examples of conducting agents include acetylene black, carbon black, and graphite.

Specific examples of binding agents include polytetrafluoroethylene (PTFE), polyvinylidene fluoride (PVdF), ethylene-propylene-diene copolymer (EPDM), and styrene-butadiene rubber (SBR).

As for the proportions of the cathode active material, the conducting agent, and the binding agent, the cathode active material is preferably in the range of 80 mass % to 95 mass %, the conducting agent is preferably in the range of 3 mass % to 18 mass %, and the binding agent is preferably in the range of 2 mass % to 7 mass %, so as to achieve excellent large-current discharge characteristics and an excellent cycle life.

A porous conductive substrate or a non-porous conductive substrate can be used as the cathode collector 105a. The thickness of the collector is preferably not smaller than 5 µm and not greater than 20 µm. Within this range, high electrode strength and an electrode weight reduction can be realized at the same time.

The cathode 105 is formed by suspending the active material, the conducting agent, and the binding agent in a widely-used solvent to prepare a slurry, applying the slurry to the cathode collector 105a, drying the slurry, and performing pressing, for example. Alternatively, the cathode 105 may be formed by preparing the active material, the conducting agent, and the binding agent in pellets to form the cathode active material layers 105b on the cathode collector 105a.

3) Anode 103

The anode 103 has a structure in which the anode active material layer(s) 103b containing an anode material is supported by one surface or both surfaces of the anode collector 103a.

The anode active material layers 103b preferably contain at least one of silicon, a silicon-containing oxide, tin, and a tin-containing oxide, as the anode active material.

The anode active material in the anode active material layers 103b is preferably at least one of silicon, a silicon-containing oxide, tin, and a tin-containing oxide. The silicon-containing oxide is $SiO_\alpha$ (0<α≤2), and may have Si deposited on the surface of $SiO_x$. The tin-containing oxide is $SnO_\beta$ (0<β≤2), and may have Sn deposited on the surface. So as to improve the cycle performance of the active material, substitution may be performed with a very small amount of another element. Furthermore, the silicon-containing oxide and the tin-containing oxide may be coated with carbon.

The number of moles ($M_{CuO}$) of the copper oxide in the cathode active material layers 105b and the total number of moles ($M_{SiSn}$) of the silicon, the silicon-containing oxide, the tin, and the tin-containing oxide in the anode active material layers 103b preferably have the relationship, $0.5 \leq M_{CuO}/M_{SiSn} \leq 1.0$. By specifying the ratio between $M_{CuO}$ and $M_{SiSn}$, the right amount of lithium can be supplied to the silicon oxide composite anode having low charge/discharge efficiency during the cycle. This ratio can be controlled by adjusting the CuO amount and the SiO amount in the cathode active material layers 105b and the anode active material layers 103b, and adjusting the ratio between the amount of the application to the cathode 105 and the amount of the application to the anode 103.

If $M_{CuO}/M_{SiSn}$ exceeds 1.0, an excess amount of lithium is applied to the anode 103, which is not preferable for security reasons. If $M_{CuO}/M_{SiSn}$ is lower than 0.5, the amount of lithium supplied from the cathode 105 to the anode 103 is likely to be too small. The preferred range of $M_{CuO}/M_{SiSn}$ is from 0.5 to 0.7.

As for the number of moles ($M_{CuO}$) of the copper oxide in the cathode active material layers 105b and the total number of moles ($M_{SiSn}$) of the silicon, the silicon-containing oxide, the tin, and the tin-containing oxide in the anode active material layers 103b, the cathode active material layers 105b of the cathode 105 extracted from the nonaqueous electrolyte secondary battery 100 are observed at 3000-fold magnification by scanning electron microscope-energy dispersive X-ray spectroscopy (SEM-EDX). After that, elemental mapping is performed with five views by EDX, to examine the respective elemental compositions. In the elemental mapping, the cathode 105 is divided into five, and the elemental mapping is performed in the middle portion, to determine the mean value.

A carbonaceous material is normally used as the anode conducting agent. The carbonaceous material preferably exhibits excellent storage properties and high conductivity with respect to alkali metals. Examples of carbonaceous materials include acetylene black, carbon black, and graphite having high crystallinity.

Examples of binding agents include polytetrafluoroethylene (PTFE), polyvinylidene fluoride (PVdF), fluororubber, ethylene-butadiene rubber (SBR), polypropylene (PP), polyethylene (PE), carboxymethyl cellulose (CMC), polyimide (PI), and polyacrylimide (PAI).

As for the proportions of the anode active material, the conducting agent, and the binding agent in the anode active material layers 103a, the anode active material is preferably in the range of 70 mass % to 95 mass %, the conducting agent is preferably in the range of 0 mass % to 25 mass %, and the binding agent is preferably in the range of 2 mass % to 10 mass %. Lastly, the silicon element and the tin element in the anode active material layers 103b each preferably have an atom rate of 5% to 80% relative to the carbon element.

4) Electrolyte

As the electrolyte, a nonaqueous electrolytic solution, an electrolyte-impregnated polymer electrolyte, a polymer electrolyte, or an inorganic solid electrolyte can be used.

A nonaqueous electrolytic solution is a liquid electrolytic solution prepared by dissolving an electrolyte in a nonaqueous solvent, and is held in the voids in the electrode group.

The nonaqueous solvent is preferably a nonaqueous solvent containing, as a main component, a mixed solvent of propylene carbonate (PC) or ethylene carbonate (EC) and a nonaqueous solvent (hereinafter referred to as the second solvent) having lower viscosity than PC and EC.

The second solvent is preferably a chain carbon, and examples of such chain carbons include dimethyl carbonate (DMC), methylethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). One of those second solvents or a mixture of two or more of those second solvents can be used. The number of donors in the second solvent is preferably 16.5 or smaller.

The viscosity of the second solvent is preferably 2.8 cmp or lower at 25° C. The proportion of the ethylene carbonate or the propylene carbonate in the mixed solvent is preferably not lower than 1.0% and not higher than 80% in volume ratio. More preferably, the proportion of the ethylene carbonate or the propylene carbonate is not lower than 20% and not higher than 75% in volume ratio.

Examples of electrolytes that can be contained in the nonaqueous electrolytic solution include lithium salts (electrolytes) such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethasulfonate ($LiCF_3SO_3$), and bistrifluoromethyl sulfonyl imide lithium [$LiN(CF_3SO_2)_2$]. Particularly, it is preferable to use $LiPF_6$ or $LiBF_4$.

The amount of the electrolyte dissolved in the nonaqueous solvent is preferably not smaller than 0.5 mol/L and not larger than 2.0 mol/L.

5) Separator 104

In a case where a nonaqueous electrolytic solution or an electrolyte-impregnated polymer electrolyte is used, the separator 104 can be used. The separator 104 is a porous separator. The material of the separator 104 may be a porous film containing polyethylene, polypropylene, or polyvinylidene fluoride (PVdF), or a nonwoven cloth made of synthetic resin, for example. Particularly, so as to increase safety of the secondary battery, a porous film made of polyethylene and/or polypropylene is preferable.

The thickness of the separator 104 is preferably 30 μm or smaller. If the thickness is greater than 30 μm, the distance between the cathode and the anode becomes longer, and internal resistance might become higher. The lower limit value of the thickness is preferably 5 μm. If the thickness is smaller than 5 μm, the strength of the separator 104 is much lower, and internal short-circuiting might easily occur. More preferably, the upper limit value of the thickness is 25 μm, and the lower limit value is 1.0 μm.

The separator 104 preferably has a thermal shrinkage of 20% or lower when left at 120° C. for one hour. If the thermal shrinkage exceeds 20%, the possibility of short-circuiting due to heating becomes higher. The thermal shrinkage is preferably 15% or lower.

The porosity of the separator 104 is preferably in the range of 30% to 70%. The reason for that is as follows. If the porosity is lower than 30%, it might be difficult for the separator 104 to achieve excellent electrolyte holding properties. If the porosity exceeds 70%, on the other hand, the separator 104 might not have sufficient strength. The preferred range of the porosity is 35% to 70%.

The air transmission rate of the separator 104 is preferably 500 seconds/100 cm$^3$ or lower. If the air transmission rate exceeds 500 seconds/100 cm$^3$, it might be difficult to achieve high lithium ion mobility in the separator 104. The lower limit value of the air transmission rate is 30 seconds/100 cm$^3$. If the air transmission rate is lower than 30 seconds/100 cm$^3$, the separator 104 might not have sufficient strength.

More preferably, the upper limit value of the air transmission rate is 300 seconds/100 cm$^3$, and the lower limit value is 50 seconds/100 cm$^3$.

Second Embodiment

A nonaqueous electrolyte secondary battery 100 of a second embodiment is the same as the nonaqueous electrolyte secondary battery 100 of the first embodiment, except for the cathode 105 and the anode 103. Many aspects of the structures of the cathode 105 and the anode 103 of the second embodiment are the same as those of the cathode 105 and the anode 103 of the first embodiment, and therefore, explanation of those common aspects will not be repeated.

2) Cathode 105

The cathode active material layers 105b preferably contain at least one of lithium-copper composite oxide and lithium composite metal oxide. The lithium-copper composite oxide may have $Li_2CuO_2$ as the main phase, and may be a mixture of $Li_{2-x}CuO_2$ and CuO. Alternatively, so as to increase the thermal stability of $Li_2CuO_2$, a compound such as $Li_2Ni_{1-x}CuO_2$, which has part of the Cu element substituted by another element. When the cathode 105 containing those materials is charged, copper ions elute into the electrolytic solution in the process of a charge reaction, and diffuse into the adjacent anode active material layers 103b. As the cathode active material layers 105b are adjacent directly to the anode active material layers 103b, copper ions diffuse into the adjacent surfaces, and copper, copper oxide, or copper composite oxide can be deposited in a preferred form on the surfaces of the anode active material layers 103b. The lithium composite metal oxide is a lithium composite oxide containing a transition metal. Examples of such materials include lithium-manganese composite oxide (such as $LiMn_2O_4$ or $LiMnO_2$), lithium-nickel composite oxide (such as $LiNiO_2$), lithium-cobalt composite oxide ($LiCoO_2$), a lithium iron phosphate compound ($LiFePO_4$), lithium-nickel-cobalt-manganese composite oxide having its transition metal substituted by another metal (such as $LiNi_xCo_4Mn_zO_2$, x+y+z=1), lithium-manganese-cobalt composite oxide (such as $LiMn_{2-x}Co_xO_4$, 0≤x≤1), and a lithium composite phosphate compound (such as $LiMn_xFe_{1-x}PO_4$, 0≤x≤1).

The atomic weight rate of copper in the cathode active material layers 105b is preferably not lower than 0.1% and not higher than 10%. The atomic weight ratio of the copper including the active material, the conducting agent, and the binding agent contained in the cathode active material layers 105b is preferably not lower than 0.1% and not higher than 10% among the observed elements. If the ratio is lower than 0.1%, it is difficult to supply copper from the cathode 105 to the anode 103. If the atomic weight ratio of copper exceeds 10%, an excess amount of copper is deposited on the anode 103, and might penetrate through the separator 104, leading to internal short-circuiting. More preferably, the atomic weight ratio of copper is not lower than 1% and not higher than 5%. As for the characteristics (such as the peak intensity ratio between plane indices, the particle size distribution, and the molar ratio of the active material) other than the above described characteristics, the cathode 105 of the second embodiment preferably has the same structure as the cathode 105 of the first embodiment.

The atomic weight ratio of copper in the cathode active material layers 105b can be determined by analyzing the cathode active material layers 105b by inductively coupled plasma mass spectrometry (ICP-MS).

3) Anode 103

On the anode active material layers 103b of the second embodiment, at least one material selected from among copper, copper oxide, and copper composite oxide preferably exists in 5 to 95% of the total surface area of the anode active material layers 103b. As those materials exist in part of the surfaces of the anode active material layers 103b, the conductivity of the anode active material layers 103b containing an oxide becomes higher, and large-current discharge characteristics are improved.

So as to achieve such effects, the inventors manufactured the anode active material layers 103b that do not contain copper but contain iron, nickel, manganese, or cobalt in 5 to 95% of the surfaces of the anode active material layers 103b. However, with any of the above mentioned metals other than copper, the discharge characteristics effect is not achieved. Moreover, discharge characteristics are degraded, or life properties are degraded. The reason that copper is effective among iron, nickel, manganese, cobalt, and copper has yet to be clearly determined.

Materials other than copper may include copper oxide and copper composite oxide. Specific examples of copper oxide include CuO and $Cu_2O$, and specific examples of copper composite oxide include $(Cu_{1-x}Ni_x)O$ (0<x<1) containing another element such as Ni in part of the Cu element, a compound containing F (fluorine) in oxide ions, or a compound containing an element such as Cu, O, F, or P (phosphorus). In a case where the above mentioned copper oxide, the copper composite oxide, or the like is contained, the proportion thereof is not particularly specified, but is preferably not higher than 50% and not lower than 1% relative to the metallic copper. Copper oxide and copper composite oxide originally have low electron conductivity. Therefore, if the proportion thereof exceeds 50%, the original improvement effect becomes smaller. If the proportion thereof is 50% or lower, lithium ion conductivity in an organic film caused by reductive degradation of the electrolytic solution existing in the anode surface is normally improved, though the reason for that is not clear.

If the proportion of at least one material selected from among copper, copper oxide, and copper composite oxide on the anode active material layers 103b is smaller than 5% of the surface area of the anode active material layers 103b, it is difficult to achieve sufficient discharge characteristics and fast charge performance when a large current flows. If the proportion of at least one material selected from among copper, copper oxide, and copper composite oxide formed on the surfaces of the anode active material layers 103b exceeds 95% of the surface area of the anode active material layers 103b, lithium ion diffusion is hindered when lithium is inserted into or removed from the anode active material layers 103b. As a result, discharge characteristics and fast charge performance at a time of large current are degraded. Moreover, metallic lithium might be deposited on the anode surface. Therefore, at least one material selected from among copper, copper oxide, and copper composite oxide preferably exists in 5 to 95% of the total surface area of the anode active material layers 103b. More preferably, the above range is from 10% to 70%. Even more preferably, the range is from 15% to 60%.

On the anode active material layers 103b, the proportion of at least one material selected from among copper, copper oxide, and copper composite oxide existing in the surface area of the anode active material layers 103b is determined by the following method. The anode active material layers 103b are divided into 50 portions, and a 1-cm square region of the middle portion thereof is magnified 3000 times. The surface of the 1-cm square region is then analyzed by scanning electron microscope-energy dispersive X-ray spectroscopy. The regions in which Cu exists are determined to be regions in which at least one material selected from among copper, copper oxide, and copper composite oxide exists by SEM-EDX, and the regions in which Cu does not exist are determined to be regions in which any of copper, copper oxide, and copper composite oxide does not exist by SEM-EDX. The ratio of the Cu-existing area is calculated from the mean value as a result of the measurement carried out in the 50 regions, and is determined to be the proportion of at least one material selected from among copper, copper oxide, and copper composite oxide existing in the surface area of the anode active material layers 103b on the anode active material layers 103b.

To form at least one material selected from among copper, copper oxide, and copper composite oxide on the surfaces of the anode active material layers 103b, copper is vapor-deposited for a short period of time on the anode 103 in an uncharged state, and a heat treatment is then performed in an atmosphere having an adjusted oxygen density for a few hours. Alternatively, lithium-copper oxide is added into the active material in the cathode 105. Although copper is vapor-deposited directly on the anode 103 in an uncharged state, the amount of deposition of copper, copper oxide, or copper composite oxide, or the proportion of copper, copper oxide, or copper composite oxide per unit area on the surfaces of the anode active material layers 103b can be controlled by adjusting the vapor deposition time and the heat treatment time. If lithium-copper oxide is used as the active material in the cathode 105, the small amount of water contained in the nonaqueous electrolyte secondary battery 100 reacts to the lithium-copper oxide, and copper ions elute from the cathode 105 into the nonaqueous electrolytic solution. The eluted copper ions diffuse into the anode 103, and react to the oxide in the anode 103 and the supporting electrolyte in the electrolytic solution, so that copper, copper oxide, or copper composite oxide is deposited on the layer surfaces. The amount of deposition of copper, copper oxide, or copper composite oxide, or the proportion of copper, copper oxide, or copper composite oxide per unit area on the surfaces of the anode active material layers 103b can be controlled by changing the conditions for the aging treatment after the battery manufacturing. Specifically, the aging treatment is performed by adjusting the battery to a certain state of charge (SOC) and leaving the battery at a certain temperature for a certain period of time.

Lithium-copper oxide contains a material expressed by the compositional formula $Li_2CuO_2$ as a principal component. Other than lithium-copper oxide, copper oxide ($CuO$ or $Cu_2O$) or the like might be used. However, any substantial effect was achieved with copper oxide only. So as to provide $Li_2CuO_2$ with electronic conductivity, the active material particle surface of the cathode 105 may be coated with carbon, or the Cu in the crystal structure may be substituted by a small amount of metal. Also, so as to suppress surface reactions of the electrolytic solution and the like, the surface of $Li_2CuO_2$ may be coated with any of various oxides such as MgO or $ZrO_2$.

The supply source of copper may be copper foil as the anode collector 103a of the anode 103. The inventors also studied the use and deposition of copper foil of the anode 103. However, the anode 103 is covered with the anode active material layers 103b. Therefore, the deposition time is very long, and deposition in a preferred form was not achieved.

Regions in which copper, copper oxide, or copper composite oxide exists on the anode active material layers 103b, and regions in which any of copper, copper oxide, and copper composite oxide does not exist on the anode active material layers 103b preferably exist in the surfaces of the anode active material layers 103b. The regions in which any of copper, copper oxide, and copper composite oxide does not exist on the anode active material layers 103b function as the lithium ion diffusion path to the surfaces of the anode active material layers 103b. Accordingly, excellent discharge characteristics and fast charge performance at a time of large current can be maintained. At the same time, the regions in which copper, copper oxide, or copper composite oxide exists on the anode active material layers 103b can contribute to smooth discharge reactions by virtue of increased electron conductivity in the anode active material layers 103b.

The regions in which copper, copper oxide, or copper composite oxide exists on the anode active material layers 103b, and the regions in which any of copper, copper oxide, or copper composite oxide does not exist on the anode active material layers 103b are determined in the following manner. The regions are observed at 3000-fold magnification by scanning electron microscope-energy dispersive X-ray spectroscopy (SEM-EDX). After that, elemental mapping is performed with 50 views, and the respective elemental compositions are examined. The elemental mapping is performed by dividing the anode 103 into 50 portions and measuring the middle portion.

The largest thickness of copper, copper oxide, or copper composite oxide existing on the anode active material layers 103b is preferably not smaller than 1 nm and not greater than 100 nm. Here, the largest thickness is the thickness of copper, copper oxide, or copper composite oxide measured from the surface of an anode active material layer 103b. If the largest thickness of copper, copper oxide, or copper composite oxide existing on the anode active material layers 103b is smaller than 1 nm, a smooth discharge reaction by virtue of a desired electron conductivity increase becomes difficult. If the largest thickness of copper, copper oxide, or copper composite oxide existing on the anode active material layers 103b exceeds 100 nm, at least one material selected from among copper, copper oxide, and copper composite oxide penetrates through the separator 104 between the cathode 105 and the anode 103, and internal short-circuiting might be caused.

The largest thickness of copper, copper oxide, or copper composite oxide existing on the anode active material layers 103b can be measured by analyzing the surfaces of the anode active material layers 103b by X-ray photoelectron spectroscopy (XPS) and measuring the boundary between the element derived from copper, copper oxide, or copper composite oxide and the element derived from the anode active material layers 103b. The largest thickness is determined by dividing the anode 103 extracted from the nonaqueous electrolyte secondary battery 100 into 10 portions, and measuring the middle portion. In the second embodiment, the characteristics (such as the anode active material, $M_{CuO}/M_{SiSn}$, and the composition ratio in the anode active material layers 103b) other than the above described characteristics are the same as the characteristics of the anode 103 of the first embodiment. In the thickness measurement, etching is performed, and XPS measurement is carried out while the etching is continued. The correlation between etching time and depth is the same as that in a $SiO_2$ substrate. In the measurement, the copper signal becomes smaller in the depth direction. The thickness measured when the signal becomes smaller than the detection limit is the largest thickness.

Third Embodiment

Next, a battery pack using the above described nonaqueous electrolyte secondary battery 100 is described.

The battery pack according to a third embodiment contains one or more nonaqueous electrolyte secondary batteries 100 (or single batteries) according to one of the above described embodiments. The single batteries are used as cells of the battery pack. In a case where the battery pack contains single batteries, the respective single batteries are electrically connected in series, in parallel, or in both series and parallel.

Figure 3:
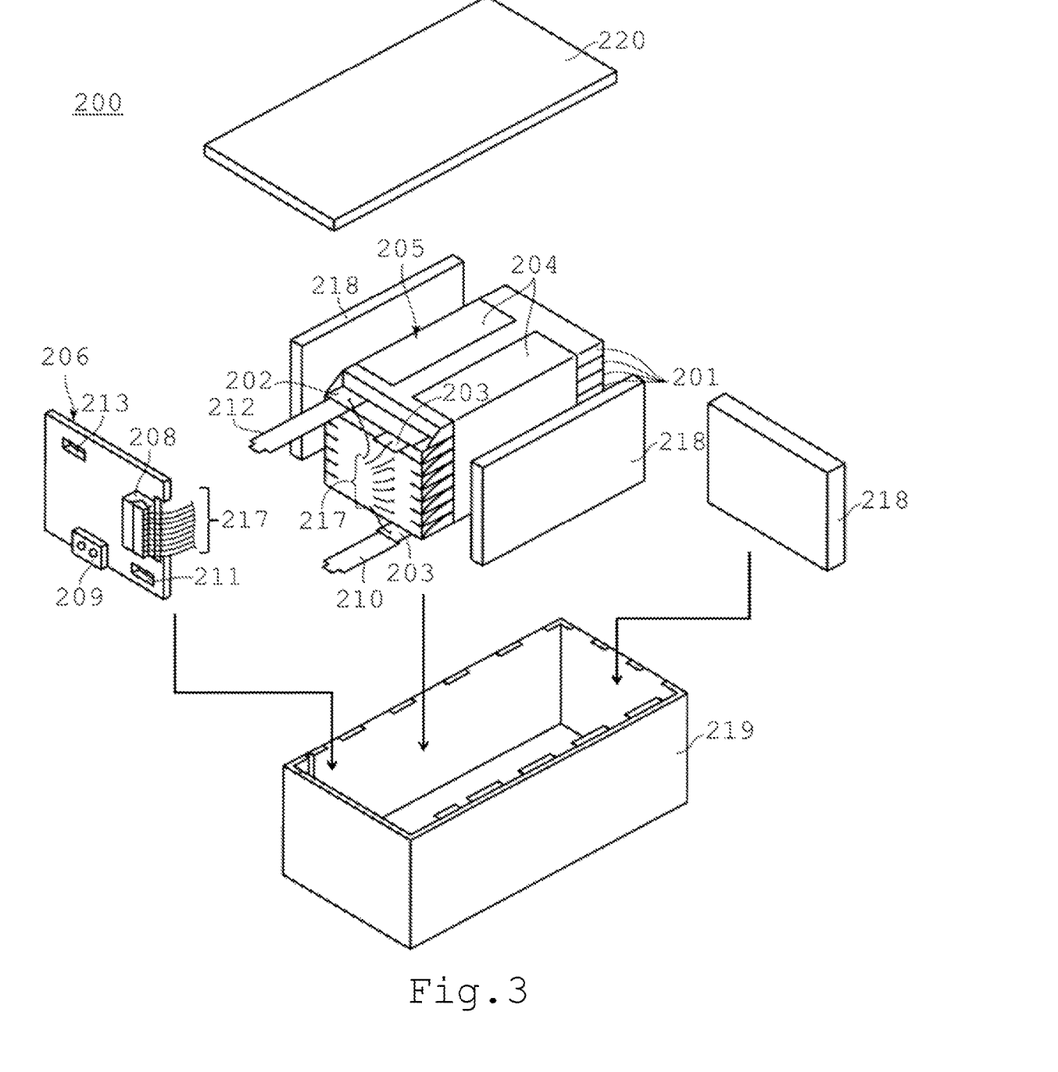
FIG. 3 is a conceptual diagram of a battery pack of an embodiment.
Figure 4:
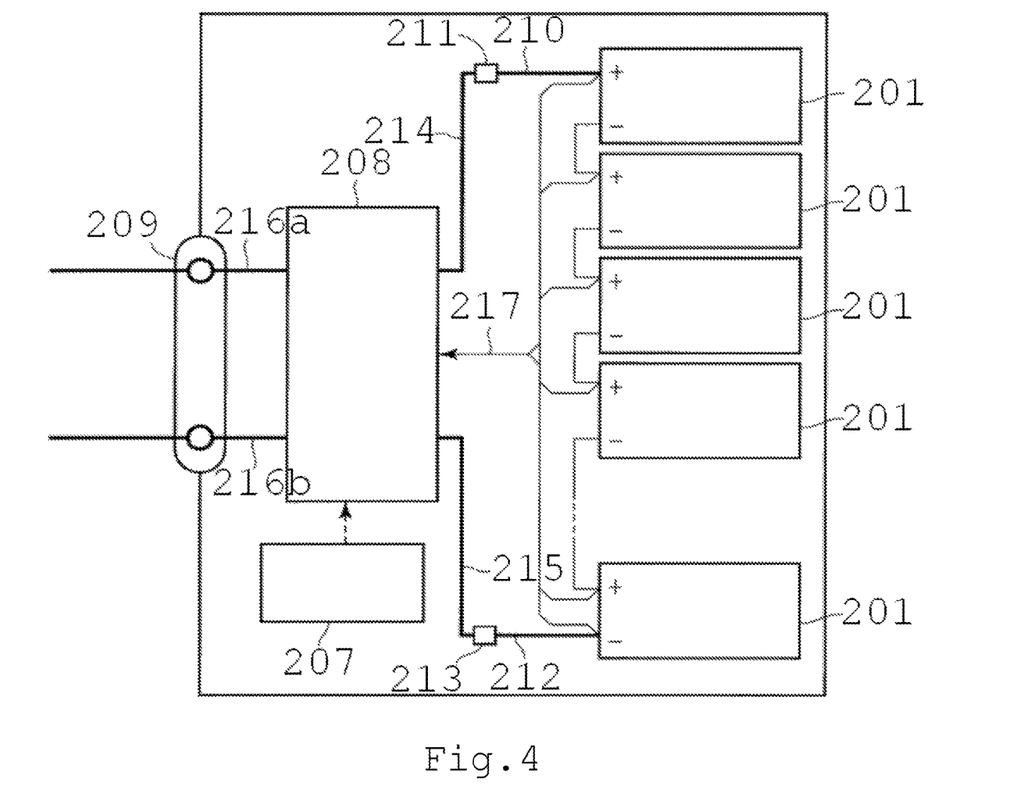
FIG. 4 is a block diagram showing the electric circuit of the battery pack of the embodiment.

Referring now to the conceptual diagram shown in FIG. 3 and the block diagram shown in FIG. 4, the battery pack 200 is described in detail. The battery pack 200 shown in FIG. 3 uses the flat nonaqueous electrolyte secondary battery 100 shown in FIG. 1 as a single battery 201.

The single batteries 201 are stacked so that the anode terminals 202 and the cathode terminals 203 extending to the outside are oriented in the same direction, and are bound with an adhesive tape 204 to form an assembled battery 205. These single batteries 201 are electrically connected in series to one another as shown in FIG. 4.

A printed circuit board 206 is placed to face the side surfaces of the single batteries 201 from which the anode terminals 202 and the cathode terminals 203 extend. As shown in FIG. 4, a thermistor 207, a protection circuit 208, and an energizing terminal 209 for an external device are mounted on the printed circuit board 206. An insulating panel (not shown) is attached to the surface of the printed circuit board 206 facing the assembled battery 205, so as to avoid unnecessary connections with the wirings of the assembled battery 205.

A cathode-side lead 210 is connected to the cathode terminal 203 located in the lowermost layer of the assembled battery 205, and the end thereof is inserted into and electrically connected to a cathode-side connector 211 of the printed circuit board 206. An anode-side lead 212 is connected to the anode terminal 202 located in the uppermost layer of the assembled battery 205, and the end thereof is inserted into and electrically connected to an anode-side connector 213 of the printed circuit board 206. These connectors 211 and 213 are connected to the protection circuit 208 through wirings 214 and 215 formed on the printed circuit board 206.

The thermistor 207 is used to detect temperature of the single batteries 201, and detected signals are transmitted to the protection circuit 208. Under predetermined conditions, the protection circuit 208 can cut off a positive-side wiring 216a and a negative-side wiring 216b provided between the protection circuit 208 and the energizing terminal 209 for an external device. One of the predetermined conditions is that a detected temperature of the thermistor 207 is equal to or higher than a predetermined temperature, for example. Another one of the predetermined conditions is that overcharge, overdischarge, overcurrent, or the like of the single batteries 201 is detected. Overcharge or the like is detected from each individual single battery 201 or all the single batteries 201. When each individual single battery 201 is examined, a battery voltage may be detected, or a cathode or anode potential may be detected. In the latter case, a lithium electrode to be used as a reference electrode is inserted into each individual single battery 201. In the example case illustrated in FIGS. 3 and 4, wirings 217 for voltage detection are connected to the respective single batteries 201, and detected signals are transmitted to the protection circuit 208 through these wirings 217.

A protective sheet 218 made of rubber or resin is attached to each of the three side surfaces of the assembled battery 205, except for the side surface from which the cathode terminals 203 and the anode terminals 202 protrude.

The assembled battery 205 as well as the respective protective sheets 218 and the printed circuit board 206 are housed in a housing container 219. That is, the protective sheets 218 are provided on both inner side surfaces extending along the long side of the housing container 219 and one inner side surface extending along the short side, and the printed circuit board 206 is provided on the other inner side surface extending along the short side. The assembled battery 205 is located in the space surrounded by the protective sheets 218 and the printed circuit board 206. A lid 320 is attached to the upper surface of the housing container 219.

To secure the assembled battery 205, a heat-shrinkable tape may be used, instead of the adhesive tape 204. In that case, protective sheets are attached to both side surfaces of the assembled battery, and the heat-shrinkable tape is wound around the assembled battery. The heat-shrinkable tape is made to shrink with heat and bind the assembled battery.

Although the single batteries 201 are connected in series in FIGS. 3 and 4, the single batteries 201 may be connected in parallel or in both series and parallel, so as to increase the battery capacity. Assembled battery packs may be further connected in series or parallel.

According to the above described embodiment, a battery pack that has excellent charge-discharge cycle performance by including nonaqueous electrolyte secondary batteries 100 of the foregoing embodiments having excellent charge-discharge cycle performance can be provided.

The form of the battery pack may be appropriately modified in accordance with usage. The battery pack is preferably used as a small-sized, large-capacity battery pack. Specifically, the battery pack may be used as the power supply for a smartphone or a digital camera, or may be mounted on a two- to four-wheeled hybrid electric vehicle, a two- to four-wheeled electric vehicle, a power-assisted bicycle, or the like.

Specific examples (specific examples of batteries of FIG. 1 manufactured under respective conditions described in the respective Examples) will be described below, and the effects thereof will be explained. However, embodiments are not limited to these examples.

Example 1

[Manufacturing of a Cathode]

A method of preparing lithium-copper oxide and copper oxide is now described. Lithium carbonate ($Li_2CO_3$) and copper oxide (CuO) were weighed so as to be "1:1" in molar ratio, and were mixed well in an agate mortar. The mixture was put into a crucible made of alumina, and was sintered and combined in an atmosphere sintering furnace. Prior to a heat treatment, the furnace was fully vacuated, and was heated while a mixed gas of an inert gas (such as Ar or nitrogen) and oxygen was introduced thereinto (0.5 to 1.0 L/min.) at 4:1. After left at 900° C. for 10 hours, the furnace was cooled to room temperature by natural cooling. By appropriately adjusting the lithium compound to be the lithium source, the mixed gas ratio, the baking temperature, and the grinding conditions, the composition ratio between $Li_2CuO_2$ and CuO, crystallinity, and the particle size distribution can be adjusted, and the later described charge/discharge conditions prior to shipment preparation, and aging can also be adjusted. The baking process was performed twice or more, to facilitate adequate reactions.

The particle size distribution of the prepared mixture of the lithium-copper oxide and the copper oxide was measured with a particle size distribution measuring device. As a result, a particle size distribution having two peaks was obtained. The peak on the smaller particle side was at 2.5 μm, and the peak on the larger particle side was at 25 μm.

A slurry was prepared by adding 60 mass % of lithium-nickel-manganese-cobalt composite oxide ($LiNi_{0.8}Mn_{0.1}Co_{0.1}O_2$) particles as an active material, 30 mass % of the mixed particles of lithium-copper oxide and copper oxide, 5 mass % of acetylene black, and 5 mass % of polyvinylidene fluoride (PVdF) to N-methylpyrrolidone, followed by mixing. This slurry was applied to aluminum foil (a collector) of 15 μm in thickness. After dried, the aluminum foil was pressed to form a cathode having cathode active material layers of 3.2 g/cm³ in density.

[Manufacturing of an Anode]

First, a slurry was prepared by adding 90% of silicon oxide composite particles in the form of composite particles formed by mixing and sintering 50 mass % of silicon oxide particles (SiO) and 50 mass % of hard carbon particles, and 10 mass % of polyimide (PI), to NMP, followed by mixing. This slurry was applied to copper foil of 12 μm in thickness, followed by drying and pressing. The copper foil was heated in an argon gas at 500° C. for eight hours, to form an anode having anode active material layers of 1.6 g/cm³ in density.

[Manufacturing of an Electrode Group]

The cathode, a separator formed with a porous polyethylene film, the anode, and the separator were stacked in this order, and were wound in a spiral form so that the anode is located in the outermost layer. In this manner, the electrode group was manufactured.

[Preparation of a Nonaqueous Electrolytic Solution]

Ethylene carbonate (EC) and methylethyl carbonate (MEC) were mixed at 1:2 in volume ratio, to form a mixed solvent. In this mixed solvent, lithium hexafluorophosphate ($LiPF_6$) was dissolved at 1.0 mol/L, to prepare the nonaqueous electrolytic solution.

[Preparation of a Nonaqueous Electrolyte Secondary Battery]

The electrode group and the nonaqueous electrolytic solution were put into a stainless cylindrical container having a bottom. One end of an anode lead was connected to the anode of the electrode group, and the other end was connected to the cylindrical container that had a bottom and served as an anode terminal. An insulating sealing plate having a cathode terminal engaged with the center portion thereof was then prepared. One end of a cathode lead was connected to the cathode terminal, and the other end was connected to the cathode of the electrode group. The insulating sealing plate was then caulked to an upper opening of the container, to assemble a cylindrical nonaqueous electrolyte secondary battery having the above described structure shown in FIG. 1.

The obtained nonaqueous electrolyte secondary battery was charged at 4.5 V at a rate of 0.2 C in a 25° C. environment, and was then discharged at a rate of 0.2 C until it reached 2 V. This cycle was repeated three times, and the battery was charged at a rate of 1 C, to have 4.5 V. After that, the battery was stored in a 35° C. environment for one day (an aging treatment). After the aging, charge and discharge in a range of 4.2 V to 2 V was repeated once at a rate of 1 C in a 25° C. environment, and the battery was adjusted to the capacity for shipment preparation.

A battery that has the same conditions as the manufactured battery was broken down into components in an inert atmosphere (an Ar atmosphere), and the following measurement was carried out. The cathode material was pulled out, and the peak intensities of the (010) plane of $Li_2CuO_2$ and the (002) plane of CuO, and the peak intensity ratio d(002)/d(010) were calculated by X-ray diffraction measurement. Under the measurement condition 2θ/θ=10° to 90° (0.2°/min.), the values of the corresponding peaks were read, and the peak intensity ratio was calculated to be 0.35.

When the number of moles ($M_c$) of the lithium composite oxide and the number of moles ($M_{Cu}$) of the lithium-copper oxide were calculated, the cathode was observed at 3000-fold magnification with a scanning electron microscope. After that, elemental mapping was performed with five views by EDX, to examine the respective elemental compositions. As a result, the molar ratio $M_{Cu}/M_c$ was 0.05.

When the number of moles ($M_{CuO}$) of the copper oxide in the cathode active material layers and the number of moles ($M_{SiSn}$) of the silicon oxide in the anode active material layers were calculated, the cathode and the anode were observed at 3000-fold magnification with a scanning electron microscope. After that, elemental mapping was performed with five views by EDX, and the respective elemental compositions were observed. As a result, $M_{CuO}/M_{SiSn}$ was 0.81.

Examples 2 Through 6

While the cathodes and the anodes were appropriately adjusted so as to have the structures shown in Table 1, nonaqueous electrolyte secondary batteries were manufactured in the same manner as in Example 1.

Comparative Examples 1 Through 3

While the cathodes and the anodes were appropriately adjusted so as to have the structures shown in Table 1, nonaqueous electrolyte secondary batteries were manufactured in the same manner as in Example 1.

TABLE 1

A

| | Method of Combining Li$_2$CuO$_2$ and CuO | | | Particle Size Distribution | | |
|---|---|---|---|---|---|---|
| | Starting Material | Baking Method | Baking Atmosphere | Number of Peaks | Peak A | Peak B |
| Example 1 | Li$_2$CO$_3$ | 900° C./ 10 h | Ar:O$_2$ = 4:1 | 2 | 2.5 μm | 25 μm |
| Example 2 | LiOH, Li$_2$CO$_3$ | 750° C./ 12 h | Ar:O$_2$ = 2:1 | 3 | 15 μm | 28 μm |
| Example 3 | Li$_2$CO$_3$ | 900° C./ 10 h | Ar:O$_2$ = 4:1 | 4 | 2.5 μm | 100 μm |
| Example 4 | Li$_2$CO$_3$ | 900° C./ 10 h | Ar:O$_2$ = 1:1 | 3 | 2.5 μm | 30 μm |
| Example 5 | Li$_2$CO$_3$ | 900° C./ 10 h | Ar:O$_2$ = 1:1 | 4 | 1.5 μm | 25 μm |
| Example 6 | LiCl | 800° C./ 10 h | Ar:O$_2$ = 4:1 | 3 | 0.5 μm | 53 μm |
| Comparative Example 1 | no addition of Li$_2$CuO$_2$ and CuO | | | N/A | | |
| Comparative Example 2 | no addition of Li$_2$CuO$_2$ and CuO | | | N/A | | |
| Comparative Example 3 | Li$_2$CO$_3$ | 600° C. | O$_2$ | 1 | 25 μm | 25 μm |

B

| | Anode Type | Aging Treatment prior to shipment | | |
|---|---|---|---|---|
| | | V | T | Period |
| Example 1 | SiO (50 wt %) hard carbon (50 wt %) | 4.5 V | 35° C. | 1 day |
| Example 2 | Si, SiO (80 wt %) graphite (20 wt %) | 4.35 V | 45° C. | Half day |
| Example 3 | Si, SiO, SiO$_2$ (80 wt %) hard carbon (20 wt %) | 4.25 V | 35° C. | Half day |
| Example 4 | Si, SiO$_{1.6}$ (40 wt %) graphite (60 wt %) | 4.4 V | 45° C. | 1.5 days |
| Example 5 | Si, SiO, SiO$_2$ (90 wt %) hard carbon (10 wt %) | 4.3 V | 30° C. | 1 day |
| Example 6 | Si, SiO$_2$ (60 wt %) graphite (50 wt %) | 4.3 V | 35° C. | 1 day |
| Comparative Example 1 | graphite | | | N/A |
| Comparative Example 2 | SiO (50 wt %) hard carbon (50 wt %) | | | N/A |
| Comparative Example 3 | SiO (50 wt %) hard carbon (50 wt %) | | | N/A |

Peak A: particle sizes at smallest-side
Peak B: particle sizes at largest-side
V: Voltage
T: Temperature The capacities of the batteries of Examples 1 through 6 and Comparative Examples 1 through 3 were examined. Table 2 shows the respective capacities, with the capacity of Comparative Example 1 being 1.

TABLE 2

| | Intensity Ratio d(002)/ d(010) | $M_{Cu}/M_C$ | $M_{CuO}/M_{SiSn}$ | Capacity | Retention Rate in 20th Cycle |
|---|---|---|---|---|---|
| Example 1 | 0.35 | 0.05 | 0.81 | 1.41 | 93% |
| Example 2 | 0.10 | 0.30 | 0.50 | 1.46 | 95% |
| Example 3 | 0.35 | 0.01 | 0.70 | 1.56 | 92% |
| Example 4 | 0.40 | 0.50 | 1.00 | 1.36 | 95% |
| Example 5 | 0.25 | 0.25 | 0.62 | 1.48 | 98% |
| Example 6 | 0.50 | 0.20 | 0.63 | 1.28 | 90% |
| Comparative Example 1 | N/A | N/A | N/A | 1.00 | 98% |
| Comparative Example 2 | N/A | N/A | N/A | 0.78 | 68% |
| Comparative Example 3 | 1.53 | 0.75 | 1.48 | 1.42 | 67% |

Intensity Ratio: Intensity Ratio Between Li$_2$CuO$_2$ and CuO
$M_{Cu}/M_C$: Mole Number Ratio Between Lithium composite metal oxide and Lithium-copper oxide
$M_{CuO}/M_{SiSn}$: Molar Ratio Between Copper oxide and Silicon oxide The capacities of Examples 1 through 6 were 1.3 to 1.5 times larger than the capacity of the conventional lithium-ion secondary battery of Comparative Example 1. Even if the anode contains silicon oxide, the capacity is smaller than the capacity of Comparative Example 1 due to a difference in charge/discharge efficiency unless the cathode contains lithium-copper oxide or the like.

A charge/discharge test was repeated 20 times at a rate of 1 C in a 25° C. environment, and the capacity retention rates in the 20th cycle relative to the capacities in the first cycle were calculated. The results are shown in Table 2. It was confirmed that the capacity decreases of Examples 1 through 6 were smaller than the capacity decreases of Comparative Examples 2 and 3, and were almost the same as the capacity decrease of Comparative Example 1. This is considered to be effects of the embodiments.

Example 7

[Manufacturing of a Cathode]

First, a slurry was prepared by adding 90 mass % of lithium-nickel-manganese-cobalt composite oxide (LiNi$_{1/3}$Mn$_{1/3}$Co$_{1/3}$O$_2$) particles as an active material, 5 mass % of acetylene black, and 5 mass % of polyvinylidene fluoride (PVdF) to N-methylpyrrolidone, followed by mixing. This slurry was applied to aluminum foil (a collector) of 15 μm in thickness. After dried, the aluminum foil was pressed to form a cathode having cathode active material layers of 3.2 g/cm$^3$ in density.

[Manufacturing of an Anode]

First, a slurry was prepared by adding 60 mass % of tin oxide particles (SnO$_2$), 15 mass % of hard carbon particles, 20 mass % of graphite particles, and 5 mass % of polyimide (PI) to NMP, followed by mixing. This slurry was applied to copper foil (a collector) of 11 μm in thickness, and was dried and pressed, so that copper was vapor-deposited in a vacuum atmosphere. The copper foil was then heated in an argon gas having an oxygen density of 2 to 5% at 500° C. for eight hours, to form an anode having anode active material layers of 2.0 g/cm$^3$ in density.

With the manufactured cathode and the manufactured anode, a cylindrical nonaqueous electrolyte secondary battery having a capacity of 1.5 Ah as in Example 1 was assembled.

The obtained secondary battery was charged at 4.3 V at a rate of 0.2 C in a 25° C. environment, and was then discharged at a rate of 0.2 C until it reached 2 V. After that, charge and discharge was repeated once at a rate of 1 C in a 25° C. environment, and the capacity was examined.

The manufactured secondary battery was broken down into components in an inert atmosphere, and the anode having the anode active material layers was pulled out. One-cm square (1 cm²) samples were randomly cut out from the anode, and these samples were subjected to XPS measurement. As a result, copper, copper oxide, and a peak derived from copper were observed in the region between 920 eV and 940 eV. The position of the peak slightly varies depending on measurement conditions and measurement devices, but the largest peak is normally observed in the region between 930 eV and 936 eV.

Further, 1-cm square (1 cm²) samples were randomly cut out from the anode, and were observed at 3000-fold magnification with a scanning electron microscope (SEM). Fifty samples were randomly selected from those samples, and were subjected to point analysis and quantitative analysis by energy dispersive X-ray spectroscopy (EDX). As a result, copper concentration differences and portions below the detection limit were found, and it was confirmed that there were regions where copper, copper oxide, or copper composite oxide with a high copper concentration existed on the anode active material layers, and regions where copper oxide and copper composite oxide did not exist on the anode active material layers. The average of the proportions of the copper element in the EDX-measured portions of the fifty samples was calculated, and was divided by 1 cm², to determine the copper-coated area in the surfaces of the anode active material layers of the anode. As a result, the copper-coated area was 36%.

Further, XPS measurement was carried out while etching was performed on the randomly selected 1 cm² electrodes. When the samples became 22 nm, no signals derived from copper were detected. Therefore, the height of copper, copper oxide, or copper composite oxide regions was determined to be 22 nm.

Example 8

[Manufacturing of a Cathode]

First, a slurry was prepared by adding 70 mass % of lithium-nickel-manganese-cobalt composite oxide ($LiNi_{1/3}Mn_{1/3}Co_{1/3}O_2$) particles as an active material, 20 mass % of lithium-copper oxide ($Li_2CuO_2$), 5 mass % of acetylene black, and 5 mass % of polyvinylidene fluoride (PVdF) to N-methylpyrrolidone, followed by mixing. This slurry was applied to aluminum foil (a collector) of 15 μm in thickness. After dried, the aluminum foil was pressed to form a cathode having cathode active material layers of 2.9 g/cm³ in density.

[Manufacturing of an Anode]

First, a slurry was prepared by adding 60 mass % of silicon oxide particles (SiO), 15 mass % of hard carbon particles, 20 mass % of graphite particles, and 5 mass % of polyimide (PI) to NMP, followed by mixing. This slurry was applied to copper foil of 11 μm in thickness, followed by drying and pressing. The copper foil was heated in an inert atmosphere at 500° C. for 24 hours, to form an anode having anode active material layers of 2.0 g/cm³ in density.

[Manufacturing of an Electrode Group]

An electrode group in a spiral form was manufactured in the same manner as in Example 7.

[Preparation of a Nonaqueous Electrolytic Solution]

A nonaqueous electrolyte secondary battery was manufactured in the same manner as in Example 7, except for the following aging conditions. The obtained secondary battery was charged at 4.3 V at a rate of 0.2 C in a 25° C. environment, and was then discharged at a rate of 0.2 C until it reached 2 V. After this cycle was repeated three times, the secondary battery was charged at a rate of 1 C so that the state of charge (SOC) became 100% (full charge). After that, the battery was stored in a 45° C. environment for one day (an aging treatment). After the aging, charge and discharge was repeated once at a rate of 1 C in a 25° C. environment.

The secondary battery subjected to the above aging treatment was then broken down into components in an inert atmosphere, and was analyzed in the same manner as in Example 7. From 1-cm square (1 cm²) electrodes, copper, copper oxide, and a peak derived from copper were observed in the region between 920 eV and 940 eV by XPS measurement. As a result of point analysis and quantitative analysis carried out with a SEM and by EDX, copper concentration differences and portions below the detection limit were found, and it was confirmed that there were regions where copper, copper oxide, or copper composite oxide with a high copper concentration existed on the anode active material layers, and regions where copper oxide and copper composite oxide did not exist on the anode active material layers. The average of the proportions of the copper element in the EDX-measured portions of the fifty samples was calculated, and was divided by 1 cm², to determine the copper-coated area in the surfaces of the anode active material layers of the anode. As a result, the copper-coated area was 48%.

Further, XPS measurement was carried out while etching was performed on the randomly selected 1 cm² electrodes. When the samples became 58 nm, no signals derived from copper were detected. Therefore, the height of the regions where copper, copper oxide, or copper composite oxide existed was determined to be 58 nm.

The cathode active material layers were pulled out from the secondary battery broken down into components, and the active material layer was scraped off the collector. ICP emission analysis was then carried out. The proportion of the copper element contained in the cathode was 3 element % among all the elements.

Examples 9 Through 14

A nonaqueous electrolyte secondary battery was manufactured in the same manner as in Example 6, except that there were changes in the anode composition, the anode copper vapor deposition conditions, the cathode composition, and the aging treatment. XPS and SEM-EDX were carried out in the same manner as in Example 7. As a result, copper, copper oxide, and copper composite oxide were deposited on the anode in the same manner as Example 7, and the deposition form was the same as that of Example 7. The results are collectively shown in Table 3.

Comparative Example 4

A nonaqueous electrolyte secondary battery was manufactured in the same manner as in Example 6, except that copper was not vapor-deposited on the anode active material layers, and lithium-copper composite oxide was not contained in the cathode.

Comparative Examples 5 Through 7

A nonaqueous electrolyte secondary battery was manufactured in the same manner as in Example 6, except that graphite with high crystallinity was used as the anode active material.

Comparative Example 8

A nonaqueous electrolyte secondary battery was manufactured substantially in the same manner as in Example 7 and Example 8, except that the amount of copper vapor-deposited on the anode active material layers and the copper element content in the cathode active material layers were larger than those in Example 7 and Example 8.

TABLE 3

| | Anode Active Material and its Proportion | Vapor Deposition on Anode | Addition of Lithium-copper Composite oxide to Cathode Active Material, and X-ray Intensity Ratio |
|---|---|---|---|
| Example 8 | Tin oxide | Performed | N/A |
| Example 9 | Tin oxide | Not Performed | $Li_2CuO_2$ |
| Example 10 | Tin oxide/Silicon oxide 1/1 | Performed | N/A |
| Example 11 | Silicon oxide | Performed | N/A |
| Example 12 | Tin oxide/Silicon oxide 2/1 | Not Performed | $Li_2CuO_2$/CuO Ratio: 0.5 |
| Example 13 | Silicon oxide | Performed | $Li_2CuO_2$/CuO Ratio: 0.23 |
| Example 14 | Silicon oxide | Not Performed | $Li_2Ni_{0.3}Cu_{0.7}O_2$/CuO Ratio: 0.3 |
| Example 15 | Tin oxide/Silicon oxide 1/7 | Not Performed | $Li_2CuO_2$/CuO Ratio: 0.1 |
| Comparative Example 4 | Tin oxide/Silicon oxide 1/1 | Not Performed | N/A |
| Comparative Example 5 | Graphite | Not Performed | N/A |
| Comparative Example 6 | Graphite | Performed | N/A |
| Comparative Example 7 | Graphite | Performed | $Li_2CuO_2$ |
| Comparative Example 8 | Tin oxide | Performed | $Li_2CuO_2$ |

Area of Existence of Copper, Copper oxide, and Copper composite oxide
Height of Copper, Copper oxide, and Copper composite oxide

| | Aging Treatment | Copper Element Proportion in Cathode | Area of Existence | Height |
|---|---|---|---|---|
| Example 8 | Not Performed | Below Detection Limit | 36% | 22 nm |
| Example 9 | Performed | 3 atom % | 48% | 58 nm |
| Example 10 | Not Performed | Below Detection Limit | 88% | 78 nm |
| Example 11 | Not Performed | Below Detection Limit | 6% | 6 nm |
| Example 12 | Performed | 13 atom % | 85% | 78 nm |
| Example 13 | Performed | 20 atom % | 95% | 100 nm |
| Example 14 | Performed | 0.1 atom % | 5% | 13 nm |
| Example 15 | Performed | 0.7 atom % | 13% | 1 nm |
| Comparative Example 4 | Not Performed | Below Detection Limit | 0% | N/A |
| Comparative Example 5 | Not Performed | Below Detection Limit | 0% | N/A |
| Comparative Example 6 | Not Performed | 3 atom % | 6% | 14 nm |
| Comparative Example 7 | Performed | 7 atom % | 78% | 83 nm |
| Comparative Example 8 | Performed | 43 atom % | 99% | 130 nm |

The nonaqueous electrolyte secondary batteries of Examples 7 through 14 and Comparative Examples 4 through 8 were put into a 100% charged state at a rate of 1 C, and discharge was then performed at a rate 10 C until it reached 2 V. The capacity retention rate relative to the discharge capacity at the rate of 1 C was calculated. The secondary batteries of Examples 7 through 14 and Comparative Examples 4 through 6 manufactured in the same manner were also put into a 100% charged state at a rate of 1 C, and were stored in a −20° C. environment for one week. After that, discharge was performed at a rate of 1 C without any additional charge, and the remaining capacities were measured. At this point, the proportions of the remaining capacities to the initial capacities, or the remaining capacity ratios, were calculated. The obtained results are collectively shown in Table 4.

Samples of 2 cm×2 cm in size were cut out from only the anodes of Examples 9 through 14 and Comparative Examples 1 through 3, and the discharge capacities per unit mass were calculated. For the anode discharge capacities, half cells of metallic lithium of the counter electrode were used, and the same electrolytic solution as that of Example 6 was used. The current density was 1 mA/cm², and the potential range was from 0.01 V to 1.5 V (Li being the reference potential). With the graphite anode of Comparative Example 5 being 1, the capacity ratios of Examples 7 through 14 were calculated. The obtained results are collectively shown in Table 4.

TABLE 4

| | Anode Capacity | Remaining Capacity Ratio (%) after −20° C. storage | Capacity Retention Rate (%) After 10 C. Discharge |
|---|---|---|---|
| Example 8 | 2.91 | 98 | 68 |
| Example 9 | 2.82 | 96 | 69 |
| Example 10 | 3.10 | 92 | 70 |
| Example 11 | 3.31 | 99 | 63 |
| Example 12 | 3.05 | 95 | 68 |
| Example 13 | 2.92 | 94 | 64 |
| Example 14 | 3.03 | 98 | 58 |
| Example 15 | 3.05 | 98 | 59 |
| Comparative Example 4 | 2.95 | 98 | 42 |
| Comparative Example 5 | 1.00 | 98 | 65 |
| Comparative Example 6 | 0.99 | 97 | 63 |
| Comparative Example 7 | 0.98 | 95 | 59 |
| Comparative Example 8 | 2.20 | 85 | 65 |

Anode Capacity: Anode Capacity (Comparative Example 5 being reference capacity)

Through comparisons between Examples 7 through 14 and Comparative Examples 5 through 7, it was confirmed that anodes formed with tin oxide or silicon oxide achieved higher capacities than those of graphite anodes. Through comparisons between Examples 7 through 14 and Comparative Example 4, it was confirmed that anodes coated with a copper compound improved discharge characteristics at a time of large current. On the other hand, it was confirmed that copper compound deposition or coating on graphite anodes that originally had high conductivity was hardly beneficial or even degraded characteristics, as in Comparative Examples 6 and 7.

The remaining capacity ratios measured through the battery storage test in a −20° C. environment are considered to reflect not self-discharge reactions caused by chemical reactions in the batteries but semi-short-circuiting due to internal short-circuiting. When the height of the island regions (the portions coated with copper, copper oxide, or copper composite oxide) in the anode becomes almost 100 nm as in Example 12, the remaining capacity ratio tends to become lower, and very small short-circuiting to such a degree as to maintain security is likely to have occurred in the battery. Comparative Example 8 represents a system in which an excess amount of copper coating is provided. In that case, short-circuiting easily occurred, and the discharge characteristics at a time of large current were not desirable.

Through a comparison between Example 7 and Example 8, it is confirmed that the technique of vapor-depositing copper on the anode in advance and the technique of adding copper composite oxide to the cathode can achieve the same effects. Both techniques can be combined as in Example 7. In view of productivity, adding lithium-copper composite oxide to the cathode material in advance is more preferable than performing vapor deposition on the anode in advance. However, in the scope of the embodiments, either technique can be used.

From the above results, nonaqueous electrolyte secondary batteries of the embodiments can suppress internal short-circuiting while maintaining large anode capacities and large-current discharge characteristics.

In the specification, some of the elements are shown by chemical symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery comprising:
an exterior member;
a cathode including a cathode active material layer housed in the exterior member;
an anode including an anode active material layer housed in the exterior member and spatially separated from the cathode by a separator; and
a nonaqueous electrolyte filled in the exterior member,
wherein the cathode active material layer contains lithium-copper oxide and copper oxide,
wherein a peak intensity ratio d(002)/d(010) between a plane index d(010) derived from the lithium-copper oxide and a plane index d(002) derived from the copper oxide is not lower than 0.1 and not higher than 0.5 at an X-ray diffraction peak, and
wherein the anode active material layer contains at least one material selected the group consisting of silicon, a silicon-containing oxide, tin, and a tin-containing oxide.

2. The battery according to claim 1, wherein the lithium-copper oxide and the copper oxide have two or more peaks in a particle size distribution.

3. The battery according to claim 1, wherein the lithium-copper oxide and the copper oxide have a peak between 0.5 μm and 15 μm and a peak between 20 μm and 100 μm in a particle size distribution.

4. The battery according to claim 1, wherein the cathode active material layer further contains lithium composite metal oxide, and
$0.01 \leq (M_{Cu}/M_c) \leq 0.5$ is satisfied, where $M_c$ represents the number of moles of the lithium composite metal oxide, and $M_{Cu}$ represents the number of moles of the lithium-copper oxide.

5. The battery according to claim 1, wherein a molar ratio $M_{CuO}/N_{SiSn}$ between the number of moles ($M_{CuO}$) of the copper oxide and the total number of moles ($M_{SiSn}$) of the silicon, the silicon-containing oxide, the tin, and the tin-containing oxide satisfies $0.5 \leq M_{CuO}/M_{SiSn} \leq 1.0$.

6. A battery pack comprising a nonaqueous electrolyte secondary battery which includes:
an exterior member;
a cathode including a cathode active material layer housed in the exterior member;
an anode including an anode active material layer housed in the exterior member and spatially separated from the cathode by a separator; and
a nonaqueous electrolyte filled in the exterior member,
wherein the cathode active material layer contains lithium-copper oxide and copper oxide,
wherein a peak intensity ratio d(002)/d(010) between a plane index d(010) derived from the lithium-copper oxide and a plane index d(002) derived from the copper oxide is not lower than 0.1 and not higher than 0.5 at an X-ray diffraction peak, and
wherein the anode active material layer contains at least one material selected the group consisting of silicon, a silicon-containing oxide, tin, and a tin-containing oxide.

7. The battery pack according to claim 6, wherein the lithium-copper oxide and the copper oxide have two or more peaks in a particle size distribution.

8. The battery pack according to claim 6, wherein the lithium-copper oxide and the copper oxide have a peak between 0.5 μm and 15 μm and a peak between 20 μm and 100 μm in a particle size distribution.

9. The battery pack according to claim 6, wherein the cathode active material layer further contains lithium composite metal oxide, and
$0.01 \leq (M_{Cu}/M_c) \leq 0.5$ is satisfied, where $M_c$ represents the number of moles of the lithium composite metal oxide, and $M_{Cu}$ represents the number of moles of the lithium-copper oxide.

10. The battery pack according to claim 6, wherein a molar ratio $M_{CuO}/M_{SiSn}$ between the number of moles ($M_{CuO}$) of the copper oxide and the total number of moles ($M_{SiSn}$) of the silicon, the silicon-containing oxide, the tin, and the tin-containing oxide satisfies $0.5 \leq M_{CuO}/M_{SiSn} \leq 1.0$.

11. A nonaqueous electrolyte secondary battery comprising:
an exterior member;
a cathode including a cathode active material layer housed in the exterior member;

an anode including an anode active material layer housed in the exterior member and spatially separated from the cathode by a separator; and a nonaqueous electrolyte filled in the exterior member, wherein at least one material selected from the group consisting of copper, copper oxide, and copper composite oxide exists in 5 to 95% of a surface area of the anode active material layer on the anode active material layer, and wherein the anode active material layer contains at least one material selected the group consisting of silicon, a silicon-containing oxide, tin, and a tin-containing oxide.

12. The battery according to claim 11, wherein the largest thickness of the one of copper, copper oxide, and copper composite oxide existing on the anode active material layer is not smaller than 1 nm and not greater than 100 nm.

13. The battery according to claim 11, wherein an atomic weight ratio of copper in the cathode active material layer is not lower than 0.1% and not higher than 10%.

14. The battery according to claim 11, wherein the cathode active material layer contains lithium-copper oxide and copper oxide, and a peak intensity ratio d(002)/d(010) between a plane index d(010) derived from the lithium-copper oxide and a plane index d(002) derived from the copper oxide is not lower than 0.1 and not higher than 0.5 at an X-ray diffraction peak.

\* \* \* \* \*